US006389203B1

(12) United States Patent
Jordan et al.

(10) Patent No.: US 6,389,203 B1
(45) Date of Patent: May 14, 2002

(54) TUNABLE ALL-PASS OPTICAL FILTERS WITH LARGE FREE SPECTRAL RANGES

(75) Inventors: Rebecca Jordan, Millington; Christi Kay Madsen, South Plainfield, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/573,086

(22) Filed: May 17, 2000

(51) Int. Cl.[7] .............................. G02B 6/12; G02B 6/10
(52) U.S. Cl. ............................ 385/50; 385/131; 385/14
(58) Field of Search .................................. 385/3, 24, 32, 385/50, 14, 42, 131, 132

(56) References Cited

U.S. PATENT DOCUMENTS 4,695,121 A * 9/1987 Mahapatra et al. ........... 385/14
5,091,983 A * 2/1992 Lukosz ......................... 385/14

OTHER PUBLICATIONS

Doerr, C.R., Joyner, C.H., Stulz, L.W., "Integrated WDM Dynamic Power Equalizer with Potentially Low Insertion Loss", *IEEE Photonics Technology Letters*, vol. 10, No. 10, Oct. 1998.
Little, B.E. et al., "Ultra–Compact Si–SiO$_2$ Microring Resonator Optical Channel Dropping Filters", *IEEE Photonics Technology Letters*, vol. 10, No. 4, Apr. 1998, pp. 549–551.
Matsumoto, Shiro et al., "Electro–optic Effect and Propagation Loss in Polymer Films Containing Nano–sized Droplets of Liquid Crystal", *Technical Digest*, vol. 14, Oct. 1997.
Alping, A., et al., "Highly Efficient Waveguide Phase Modular for Integrated Optoelectronics", *Appl. Phys. Lett. 48(19)*, May 12, 1986, pp. 1243–1245.
Vengsarkar, Ashish M. et al., "Long–Period Fiber Gratings as Band–Rejection Filters", *Journal of Lightwave Technology*, vol. 14, No. 1, Jan. 1996, pp. 58–65.
Madsen, C.K. et al., "Optical All–Pass Filters for Phase Response Design with Applications for Dispersion Compensation", *IEEE Photonics Technology Letters*, vol. 10, No. 7, Jul. 1998, pp. 994–996.
Madsen, C.K., "A Multiport Frequency Band Selector with Inherently Low Loss, Flat Passbands, and Low Crosstalk", *IEEE Photonics Technology Letters*, vol. 10, No. 12, Dec. 1998, pp. 1766–1768.
Madsen, C.., "Efficient Arhitectures for Exactly Realizing Optical Filters with Optimum Bandpass Designs", *IEEE Photonics Technology Letters*, vol. 10, No. 8, Aug. 1998, pp. 1136–1138.

* cited by examiner

*Primary Examiner*—Ricky Mack
*Assistant Examiner*—Alicia M. Harrington
(74) *Attorney, Agent, or Firm*—Lowenstein Sandler PC

(57) ABSTRACT

In accordance with the invention, a tunable optical all-pass filter with a substrate-supported multilayer waveguiding structure. A first layer including a waveguiding optical ring resonator, a second layer for spacing, and a third layer including a curved waveguide. The curved waveguide is optically coupled to the resonator by two spaced apart optical couplers extending through the spacing layer, and tunability is provided by a first phase-shifter to control the optical pathlength of the resonator and a second phase-shifter operative on the waveguide to control the strength of coupling between the waveguide and the resonator. In one embodiment, the waveguide and the resonator are horizontally spaced apart in the non-coupling regions to provide optical isolation. In another, the waveguide and resonator can overlap horizontally, but the spacer layer is thicker in the non-coupling regions to provide optical isolation.

8 Claims, 3 Drawing Sheets

TUNABLE ALL-PASS OPTICAL FILTERS WITH LARGE FREE SPECTRAL RANGES

FIELD OF THE INVENTION

This invention relates to optical filters and, in particular, to tunable all-pass optical filters.

BACKGROUND OF THE INVENTION

Optical fiber communication systems are beginning to achieve great potential for the rapid transmission of vast amounts of information. In essence, an optical fiber system comprises a light source, a modulator for impressing information on the light, and optical fiber transmission line for carrying the optical signals and a receiver for detecting the signals and demodulating the information they carry. Increasingly the optical signals are wavelength division multiplexed signals (WDM signals) comprising a plurality of distinct wavelength signal channels.

Dispersion compensating devices are important components of optical communication systems. Chromatic dispersion occurs when signal components of different wavelengths are subject to different propagation delays. Such dispersion can distort a transmitted pulse and deteriorate the information content of a signal channel. Dispersion compensating devices equalize the propagation delays among the different wavelength components and maintain the quality of the transmitted information.

All-pass filters are useful in optical communication systems. An all-pass filter (APF) substantially equalizes phases among the different wavelength components of a signal with minimal modification of the amplitude response.

Accordingly an APF is highly useful in compensating chromatic dispersion. APFs are also useful in wavelength-dependent delay lines and in more complex filters.

Tunability is an important functionality in all-pass filters. Conditions in an optical communication system can change as channels are added, dropped and rerouted among branches. Consequently filters need to be tunable so that they can be adapted to changing conditions. Even in static applications tunability is useful to compensate fabrication variations.

FIG. 1 schematically illustrates a conventional tunable optical all-pass filter comprising An optical waveguide 10 coupled to a co-planar ring resonator 11 by two couplers 12A and 12B. The segment of waveguide 10 between the couplers and the adjacent portion of the resonator 11 form a Mach Zehnder interferometer 13. A first phase-shifter 15 in the waveguide and a second phase-shifter 16 in the resonator can be used to tune the filter.

In operation, a light pulse traveling in the waveguide 10 couples in part to the resonator 11. After transit around the resonator the light couples back to the waveguide. Interference between the light from the resonator and light transmitted on the waveguide produces a frequency dependent time delay that compensates dispersion. The response of the device is periodic in frequency, and the period is called the free spectral range (FSR).

The performance of the device depends on the resonator optical pathlength and the strength of coupling between the resonator and the waveguide. The resonator pathlength determines the FSR of the device, and the coupling strength determines the maximum group delay and the bandwidth of the delay.

Control over the phase-shifters 15, 16 permits tuning. These phase-shifters are typically localized heaters which change the refractive index of the underlying material. Control over phase-shifter 16 permits tuning of the resonator pathlength and hence the FSR. Control over phase-shifter 15 permits tuning of the phase difference between the waveguide arm and the resonator arm of the MZI. This tuning in turn, changes the coupling strength and thereby tunes the group delay and bandwidth.

These tunable filters work well for many applications, but with the demand for increasing bandwidth, smaller devices are required. But as the dimensions of the device become smaller, it becomes increasingly difficult to thermally isolate the waveguide and the resonator so that they may be independently tuned. Accordingly there is a need for a new architecture in tunable all-pass filters.

SUMMARY OF THE INVENTION

In accordance with the invention, a tunable optical all-pass filter comprises a substrate-supported multilayer waveguiding structure comprising a first layer including a waveguiding optical ring resonator, a second layer for spacing, and a third layer including a curved waveguide. The curved waveguide is optically coupled to the resonator by two spaced apart optical couplers extending through the spacing layer, and tunability is provided by a first phase-shifter to control the optical pathlength of the resonator and a second phase-shifter operative on the waveguide to control the strength of effective coupling between the input/output waveguide and the resonator. In one embodiment, the waveguide and the resonator are horizontally spaced apart in the non-coupling regions to provide optical isolation. In another, the waveguide and resonator can overlap horizontally, but the spacer layer is thicker in the non-coupling regions to provide optical isolation.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for illustrating the concepts of the invention and are not to scale.

DETAILED DESCRIPTION

Figure 1:
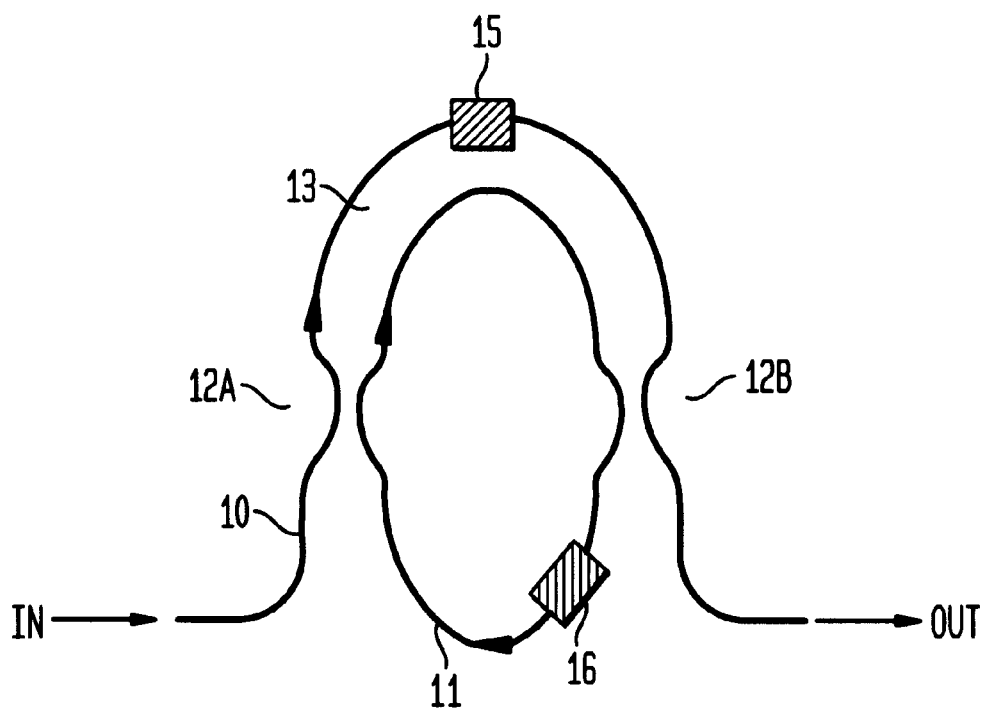
FIG. 1 is a schematic top view of a conventional tunable all-pass optical filter.

Referring to the drawings, FIG. 1 illustrating a conventional tunable all-pass filter was discussed in the Background of the Invention.

Figure 2A:
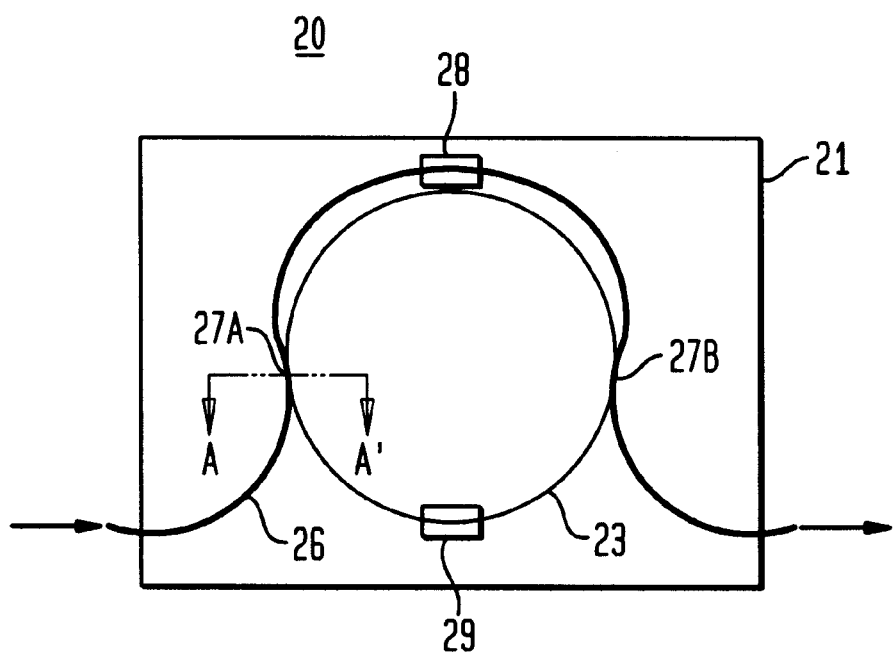
FIGS. 2A and 2B are schematic top and cross sectional views of an all-pass filter in accordance with a first embodiment of the invention.
Figure 2B:
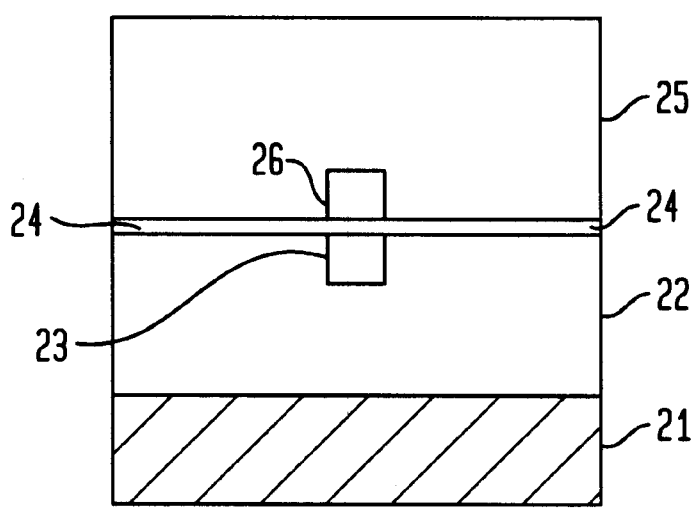

FIGS. 2A and 2B are top and cross sectional views, respectively, of a first embodiment of an all-pass filter 20 formed on a substrate 21. The filter 20 comprises a first layer 22 including a waveguiding optical ring resonator 23, a second layer 24 for spacing, and a third layer 25 including a waveguide 26 curving in substantial conformity to a portion of resonator 23. The waveguide 26 is optically coupled to the resonator 23 vertically through spacer layer 24 at the coupling regions 27A and 27B where the waveguide and resonator overlap. The waveguide 26 is curved so that the segment of waveguide 26 between the couplers 27A and 27B has substantially the same pathlength as the segment of the resonator between the couplers. In the regions away from the coupling regions, the waveguide 26 and the resonator 23 are horizontally spaced apart (i.e. do not overlap) by a sufficient distance that they are optically isolated in these non-coupling regions. The cross section in FIG. 2A is taken across the line A–A', and shows the waveguide (core) 26 overlying the resonator (core) 23 across the spacing layer 24 in the coupling region 27A.

The waveguide 26 is provided with a first phase-shifter 28 in the segment between 27A and 27B. The resonator 23 is provided with a second phase-shifter 29 in the region downstream of 27B. It is contemplated that phase-shifters 28 and 29 can be local heaters. If so, the material of the layer 25 can have a large temperature dependence compared with the temperature dependence of layer 22. For example, layer 22 can be silica and layer 25 can be a polymer. In this way, heat used to tune waveguide 26 will have minimal effect on resonator 23.

The substrate 21 can be silicon, the first (cladding) layer, 22 can be silica with the resonator (core) 23 formed of a higher index phosphous-doped (P-doped) or Ge-doped silica. The spacer layer can be silica having a thickness in the range 0–0.5 $\mu$m. The third (cladding) layer 25 can be polymer such as a mixture of halogenated acrylates having a refractive index with a large temperature dependence as compared with that of layer 22. The waveguide core 26 in layer 25 can be formed by locally changing the mixture of halogenated acrylates to increase the refractive index over the cladding layer. In the coupling regions 27A and 27B, the resonator and waveguide horizontally coincide. In the non-coupling region between 27A and 27B, they are spaced apart by a distance sufficient to prevent coupling (typically an edge-to-edge spacing of more than 5 $\mu$m).

Figure 3A:
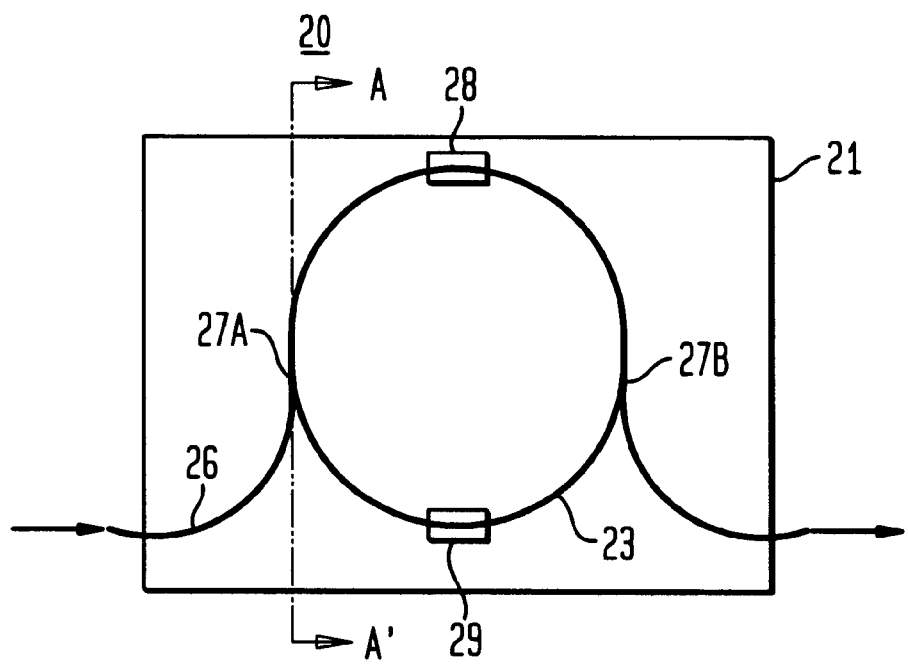
FIGS. 3A and 3B are top and cross sectional views of a second embodiment.
Figure 3B:
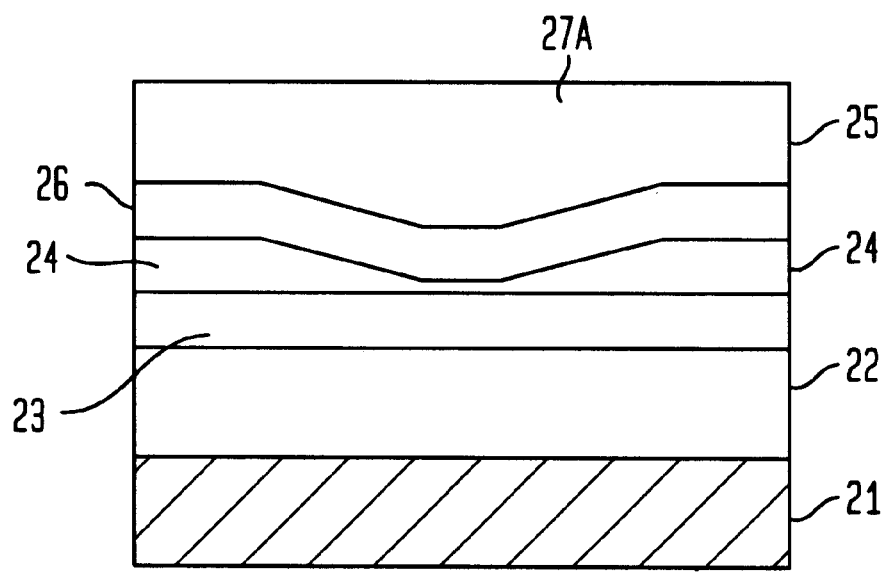

FIGS. 3A and 3B are top and cross sectional views of a second embodiment of an all-pass filter similar to that of FIG. 2 except that spacer layer 24 is a thick layer capable of optically isolating the waveguide from the resonator except in the coupling regions 27A and 27B where the layer 24 is thinned to permit coupling. A resulting coupling region (27A) is shown in FIG. 3B, which is a cross section along the line B–B'. With this arrangement the waveguide 26 can overlap the resonator even in the non-coupling region between 27A and 27B.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed:

1. A tunable optical all-pass filter comprising:

a substrate;

a first layer on said substrate including a waveguide optical ring resonator;

a second layer;

a third layer including a curved waveguide;

the curved waveguide optically coupled to the optical ring resonator through the second layer by at least two optical couplers;

a first phase shifter for adjusting the optical pathlengths of the ring resonator; and a second phase shifter for adjusting the path length of the waveguide between the two optical couplers.

2. The all-pass filter of claim 1 wherein the second layer is of uniform thickness and the curved waveguide is offset from the resonator in the regions outside the couplers to provide optical isolation between the waveguide and the resonator.

3. The all-pass filter of claim 1 wherein the second layer in the regions outside the coupler is sufficiently thick to provide optical isolation between the waveguide and the resonator.

4. The tunable filter of claim 1 wherein the first phase shifter comprises a heater thermally coupled to the ring resonator.

5. The tunable filter of claim 1 wherein the second phase shifter comprises a heater thermally coupled to the curved waveguide.

6. The tunable filter of claim 4 wherein the third layer has a refractive index with a larger temperature dependence than the first layer.

7. The tunable filter of claim 5 wherein the third layer has a refractive index with a larger temperature dependence than the first layer.

8. The tunable filter of claim 1 wherein the substrate comprises silicon, the first layer comprises silica, the second layer comprises silica and the third layer comprises a halogenated acrylate.

* * * * *